May 7, 1935.  N. DEISCH  2,000,380
APPARATUS FOR THE FORMATION OF IMAGES
Original Filed Sept. 24, 1930   3 Sheets-Sheet 1

May 7, 1935.  N. DEISCH  2,000,380
APPARATUS FOR THE FORMATION OF IMAGES
Original Filed Sept. 24, 1930   3 Sheets—Sheet 3
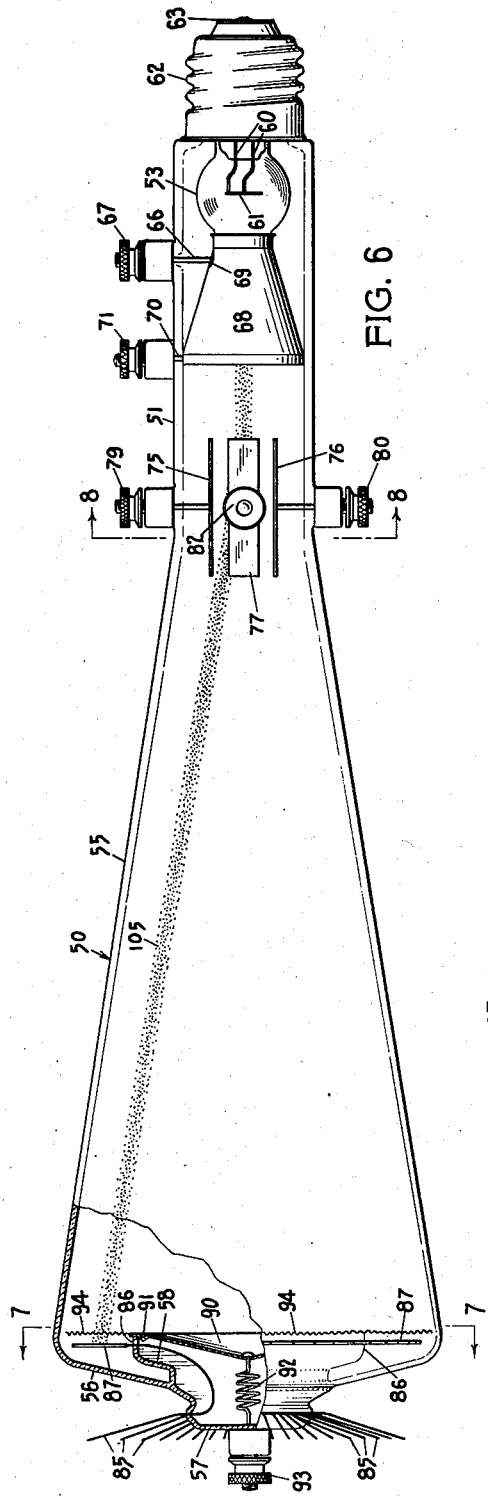
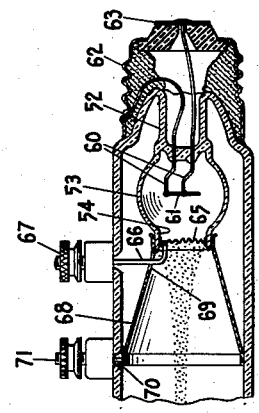
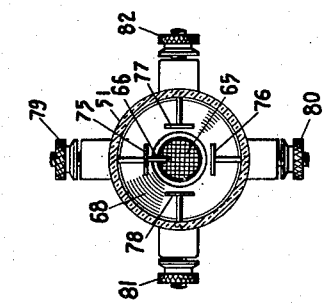
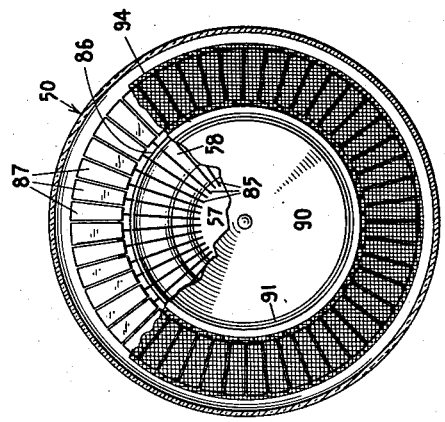
Inventor
Noel Deisch.

Patented May 7, 1935

2,000,380

UNITED STATES PATENT OFFICE

2,000,380

APPARATUS FOR THE FORMATION OF IMAGES

Noel Deisch, Washington, D. C., assignor of one-half to Thos. E. Stone, Jr., New York, N. Y.

Application September 24, 1930, Serial No. 484,149
Renewed October 1, 1934

10 Claims. (Cl. 178—6)

The present invention relates to the formation of images, and is a continuation in part of my copending application on apparatus for the formation of images Serial Number 469,855, filed July 22, 1930.

The general object of the invention, broadly stated, is to provide means for the translation of the electric current analogue of an image into a real image. Its more restricted object is to provide improved commutating means between the image cell and the actuating circuit.

Briefly stated, the apparatus shown in the illustrative embodiment of the invention depicted in the drawings comprises an optical system including a composite electro-optic cell involving a plurality of electrodes, as described in detail in my above-mentioned application. The improvements forming the subject of the present application are more particularly directed to a commutator including a cathode stream which is deflected into different positions, by means of which the above-mentioned electrodes are connected in cyclic progression to the line carrying the modulated current which excites the electrodes. The cathode-ray tube constituting the commutator includes means for varying the intensity of the beam in accordance with the modulations of the electric current analogue.

Referring to the drawings:

Fig. 6 is a front elevational view of the cathode ray commutator, parts being shown in fragmental section.

Fig. 7 is a section taken mainly on the line 7—7 of Fig. 6, but including parts in fragmental section.

Fig. 8 is a section on the line 8—8 of Fig. 6.

Fig. 9 is a longitudinal vertical section of the base portion of the cathode ray commutator, and shows the arrangement of the filament, the accelerating grid, and the focusing electrode.

In the transmission of images by the methods of phototelegraphy and television, it is usual to "scan" the image to be transmitted through a succession of coordinate points defining a mosaic, the scanning process consisting essentially in determining the density of the image at a succession of points and restating these density determinations in terms of some characteristic of an electric current. The two dimensional optical image is thus translated into a single dimensional electrical analogue, the variations of the parameters of which analogue in time are coordinate with the variations of density of the scanned image in space. This electric current analogue may be further converted into an electromagnetic disturbance of the Hertzian type. At the station where the image is to be reconstituted, characteristics of successive points along the analogue are translated into approximations of the density of corresponding coordinate points of the original image. It is with this process of re-translating the electric current analogue of an image into a real image that the present invention more particularly deals.

Figure 1:
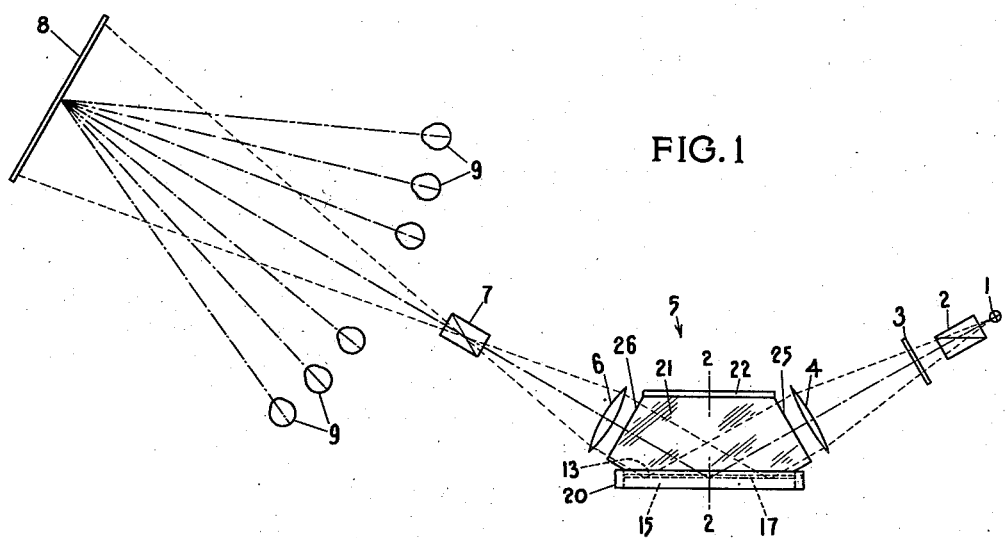
Fig. 1 is a diagram showing the optical arrangement of an image-forming system made according to the present invention.

In Fig. 1 there is shown a projection system comprising a source of radiation 1, a polarizer 2, an absorbing screen 3 adapted to select a preferably restricted region from the spectrum of the radiation emitted from the source 1, a collimating lens 4, an electro-optic cell assembly 5, an imaging lens 6, an analyzer 7, and a diffusing screen 8. The polarizer 2 and the analyzer 7 may consist of Nicol prisms, the construction of which is well known. The Nicol 2 is preferably turned on its longitudinal axis through an azimuth of 45° with respect to a plane passing through the axis of strain existing between the electrodes of the electro-optic cell 5, whereas the principal plane of the analyzer 7 is desirably but not necessarily held orthogonal with this axis of strain.

The electro-optic cell 5 comprises electrodes 10 (Figs. 2 and 3) and 11, each including elements 10a, 10b, 10c, etc., and 11a, 11b, 11c, etc., respectively. The elements 10a, 10b, 10c, etc., of the electrode 10 are linear in character, and in the illustrative case shown are, for a purpose which will presently become apparent, provided with inclined faces 18. These elements are imbedded in V-shaped troughs 12 in the transparent and insulating supporting plate 13. The electrodes 11a, 11b, 11c, etc., are also linear in character, with preferably plane and specular top surfaces 14, and are held on an insulating and preferably opaque support 15 consisting of a material such as black glass.

Figures 2, 3:
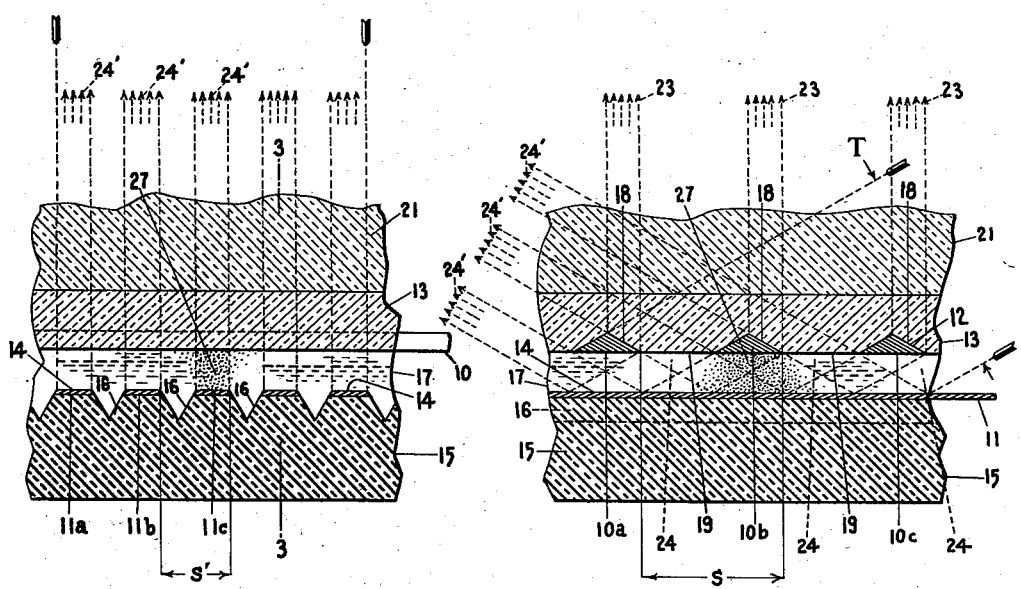
Fig. 2 is an enlarged fragmental section of the electro-optic cell taken on the line 2—2 of Fig. 1, and shows especially the arrangement of the latticed electrodes, their retaining supports, the dielectric, and the path of the incident and emergent light beams.
Fig. 3 is an enlarged fragmental section taken on the line 3—3 of Fig. 2.
Figure 4:
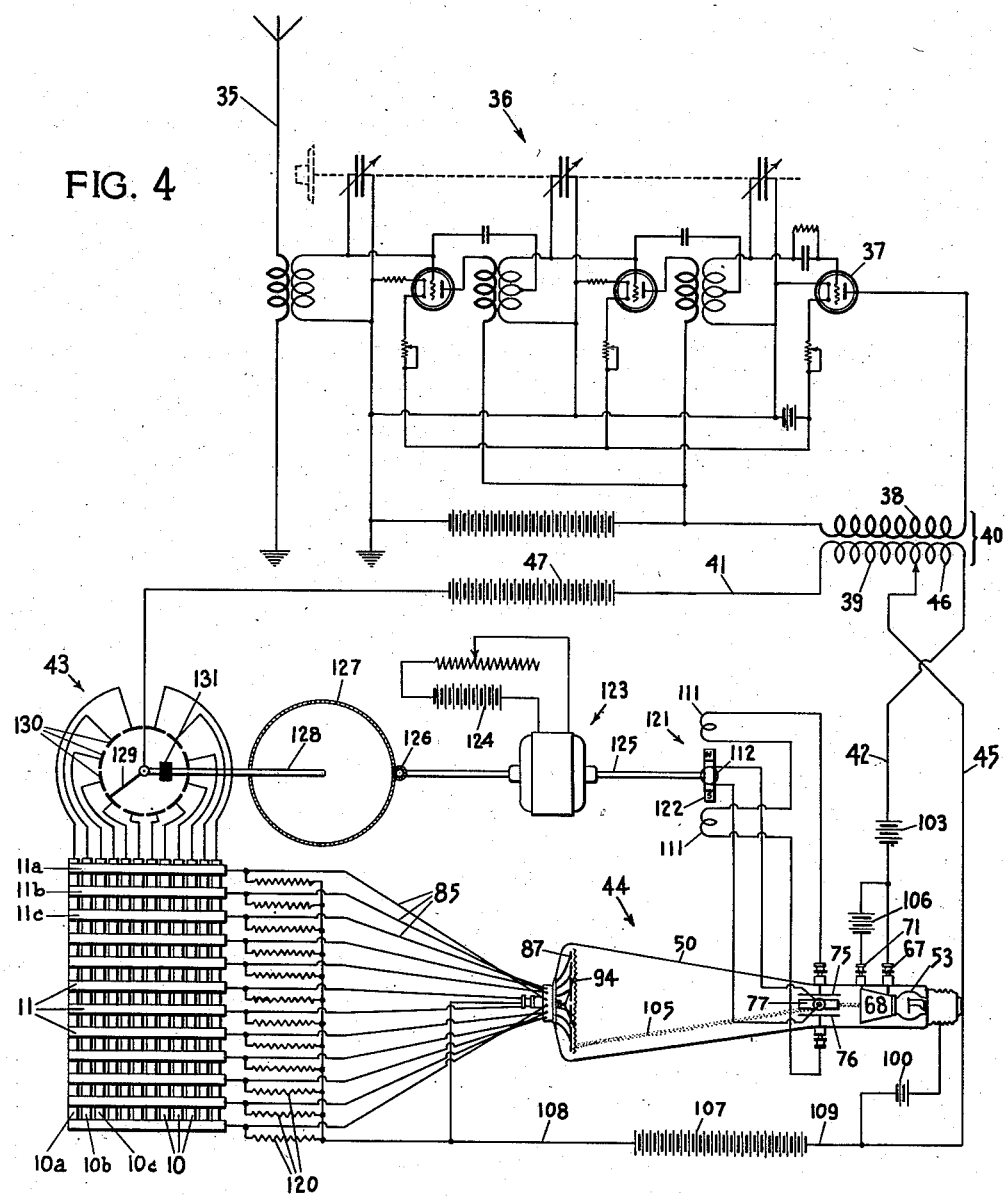
Fig. 4 is an electrical circuit diagram showing the arrangement of the latticed electrodes in the electro-optic cell, the commutator mechanism, and the line connection to an illustrative radio receiving circuit.

The electrode elements 10a, 10b, 10c, etc., and 11a, 11b, 11c, etc., in each of the electrodes are in the illustrative case parallel and coplanar, and the elements in the two sets of electrodes are held mutually perpendicular to each other, as shown in Figs. 2, 3 and 4, in such manner that the electrodes form an intersecting lattice. A plurality of independently excitable electro-optic cells arranged as a mosaic are thus formed at the intersections of the electrode elements, each adapted to translate values of electrical energy into corresponding values of light energy, and thus to form a divisible portion of a composite image. The spacing interval $s$, Fig. 3, of the electrode elements 10a, 10b, 10c, etc., is in the illustrative arrangement of the cell preferably made greater than the spacing interval $s'$, Fig. 2, of the electrode elements 11a, 11b, 11c, etc., to compensate the optical foreshortening consequent on an oblique incidence of light.

The space between the electrodes 10 and 11 is filled with an electro-optically active substance 17, such as nitrobenzol, which when subjected to electric strain, as by a difference of potential existing between members of the elements 10a, 10b, 10c, etc., becomes birefringent, according to the well-known Kerr effect.

The assembly above described constitutes a composite electro-optic cell, the unit cells, which are arranged as a mosaic, being defined by crossing electrodes and including the intervening dielectric space. The electrode supports 13 and 15 are held in a frame 20, Fig. 1, which latter maintains the proper separation between the electrodes and serves to prevent escape of the dielectric 17. To prevent surface reflection of light at the otherwise glass-air interface of the electrode support 13, a rhomboidal prism 21, Fig. 1, having plane entering and exit faces 25 and 26 respectively, is cemented to the upper surface of the electrode support 13. An absorbing plate 22, such as a plate of black or deeply colored glass, is cemented to the upper plane face of the prism 21, as shown in Fig. 1.

Light from the source 1 is polarized by the prism 2, and after passage through the filter 3, is collimated into a parallel bundle by the lens 4. It then passes into the prism 21 and the electrode support 13. Referring now to Figs. 2 and 3 it will be seen that the incident beam of light, a portion of which is shown as of the width T, falls into the plane of the electrode 10, where portions of the beam strike the inclined faces 18 of the electrode elements 10a, 10b, 10c, etc., and are reflected vertically in narrow parallel bundles 23, which fall upon the roof plate 22 of the cell 5 and are absorbed. Other portions 24 of the beam pass through the interspaces 19 between the electrode elements 10a, 10b, 10c, etc., and fall into the plane of the lower electrode 11. Here portions of the light fall upon the reflecting surfaces 14 of the electrode elements 11a, 11b, 11c, etc., and are reflected back through the interspaces 19 between the electrode elements 10a, 10b, 10c, etc. The intervening portions of the beams 24 fall upon the inclined faces of the grooves 16, by which they become trapped and are caused to be absorbed by the opaque support 15.

The collimated beam entering the cell 5 is hence first divided into a number of thin parallel ribbons of light 24, and these are further divided into a number of separate narrow square pencils of light 24', Figs. 2 and 3. It will be noted that each of the pencils of light 24' passes between a separate intersection of the electrode elements 10a, 10b, 10c, etc., and 11a, 11b, 11c, etc. These pencils emerge from the face 26 of the prism 21, are converged by the lens 6, and pass through the analyzer 7, whence they diverge and fall upon the screen 8, forming a mosaic pattern of square areas analogous to the dots of a half-tone screen. Diffuse reflection here takes place, and the image formed by the pattern of unit areas may be observed from points 9.

By energizing any pair of electrode elements of opposite polarity, such as the element 10b, Fig. 3, and 11c, Fig. 2, the space shown at 27 in Figs. 2 and 3 comprised between the nearest point of approach of these electrodes becomes subject to electric strain, and the dielectric 17 at this area becomes birefringent. The pencil of polarized light 24' which traverses this strained space is hence subject to a certain retardation, the order of which with a given dielectric and with a cell of given dimensions is determined by the magnitude of the difference of potential between the two electrodes causing the strain. This particular pencil of polarized light is hence transmitted in the analyzer 7 in amount dependent on the excitation of the electrodes 10 and 11, and the dot projected on the screen 8 is of a corresponding brightness; it is hence apparent that with each of the pencils of light 24 receiving the proper retardation a mosaic image or picture is produced on the screen 8.

In Fig. 4 is shown the apparatus by which the electrodes 10 and 11 are energized in the process of converting the electrical analogue of the transmitted image into a real image. The incoming analogue, which may for illustrative purposes be assumed to be a modulated carrier wave, is received on the aerial 35. The received signal is selected and amplified in the apparatus 36, which is shown as a radio receiving set of conventional design. The rectified current from the detecting tube 37, which varies in accordance with the modulations of the received signal, passes through the primary winding 38 of the mutual inductance coil 40. An electromotive force having corresponding variations is hence induced in the secondary winding 39 of this coil, which electromotive force is brought to act through the leads 41, 42, 45, and the commutators 43 and 44, on the electrodes 10 and 11 of the electro-optic cell 5. A biasing battery 47 may be included in the lead 41 to sensitize the electro-optic cell 5 by maintaining a certain normal bias between the electrodes 10 and 11.

In my former application above referred to, mechanical commutators were shown as being used for making contact with both sets of electrodes 10 and 11 of the cell 5. When the number of elements in the electro-optic cell is greatly increased, it may become inconvenient to use a commutator of the above type, due to the high speeds of commutation involved. It will be observed that the rate of commutation in one set of electrodes 11 is much higher than that in the other set of electrodes 10: the difficulties associated with mechanical commutation will hence first become apparent as respects the electrodes 11, and as a means of commutating with these electrodes the cathode-ray commutator indicated generally at 44 in Fig. 4, the construction of which is shown in detail in Figs. 6 to 9, inclusive, is preferably employed.

Referring to the above figures, there is shown a hermetic glass tube 50 having a cylindrical neck portion 51 bearing at its outer end a re-entry tube 52 on an extension of which is a re-entry bulb 53 having an open neck portion 54. The tube 50 further includes a cone-shaped body portion 55, and an end portion 56 bearing a bulbous outer extension 57 and a campanulate inner extension 58. In its assembled condition the tube 50 is thoroughly evacuated, though a small amount of gas may be re-introduced to assist the formation of a compact cathode stream.

Through the re-entry tube 52 are brought conducting leads 60 which bear on their inner ends the spiral emitting filament 61 located centrally of the bulb 53, the outer terminals of these leads having connection with the contacts 62 and 63 as shown in Fig. 9.

Fitting within the neck portion 54 of the bulb 53 is the controlling grid 65 which has connection through the lead 66 with the binding post 67. Fitting within the neck portion 51 of the tube 50 and over the neck portion 54 of the bulb 53 is the shielding, focusing, and accelerating electrode 68. This latter is preferably of frustro-conical shape, the diverging walls producing a better focusing of the emitted cathode stream than is secured by a cylindrical focusing electrode, as generally employed. The focusing electrode has an opening 69 through which passes without contact the lead 66 of the grid 65, the focusing electrode 68 itself making electrical contact through the lead 70 with the binding post 71.

Attached to the neck portion 51 of the tube 50 are the deflecting electrodes 75, 76, and 77, 78, which have electrical connection respectively with binding posts 79, 80, and 81, 82.

The bulbous extension 57 of the tube 50 gives entrance at points about its periphery to conducting wires 85, the inner terminals of which are secured at the peripheral portion 86 of the extension 58. These wires hold at their inner ends the receiving electrodes or commutator segments 87, which latter are grouped symmetrically about the axis of the tube. The commutator as illustrated in Figs. 6 to 9 includes 48 of the segments 87, this number corresponding to the number of image elements along one axis of the image in some systems of television at present in use. This number is merely illustrative however, and in a particular apparatus it might be desirable to include a different number of segments than that shown.

Fitting over the peripheral portion 86 of the extension 58 is the conducting plate 90 here shown as a flat cone having a ridge 91 extending annularly about its base and fitting within the rim or peripheral portion 86 of the campanular extension 58 to secure the plate 90 against lateral movement. A metallic spring 92 holds the plate 90 tightly against the mouth of the extension 58 and also serves to make electrical connection with the binding post 93. The plate 90 bears as an extension an accelerating grid 94 which is interposed between the commutator sectors 87 and the accelerating electrode 68, the grid functioning as a positively charged electrode in association with the segments 87 acting through leads 101 and 102.

Returning again to a consideration of Fig. 4, which shows a cathode-ray commutator similar to that above described as included in an assembly with the electro-optic cell 5 and associated apparatus, it will be noted that each one of the terminals 85 of the segments 87 of the cathode-ray commutator 44 has connection with one of the electrode elements 11a, 11b, 11c, etc., of the electro-optic cell 5, there being in the illustrative case shown in Fig. 4, 12 of the segments 87, and 12 of the terminals 85, to correspond with the 12 electrode elements 11a, 11b, 11c, etc. of the illustrative cell 5. Each of the terminals 85 is provided with a high resistance leak 120, which serves to drain away at a predetermined rate the charge which the electrodes 11 receive periodically from the commutator 44. The leaks 120 exhaust into the common lead 108.

The grid 65 and the focusing electrode 68 of the commutator 44 are connected through the portion 46 of the secondary 39 of the mutual inductance coil 40 to the filament 61 by leads 42 and 45.

Figure 5:
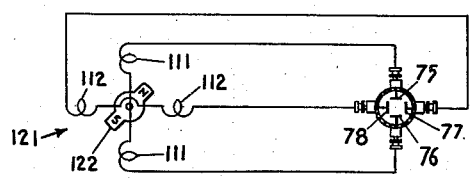
Fig. 5 is a diagram showing the connection of a two-phase alternating current generator to the deflecting electrodes of the cathode ray commutator.

The deflecting electrodes 75 and 76 have connection with the stationary armature coils 111 of the two phase alternator 121, and the electrodes 77, 78 have connection with the armature coils 112, as shown most plainly in Fig. 5.

In operation the filament 61 is heated by the battery 100, Fig. 4, by which the filament is placed in electron emitting condition, and electrons diffuse out into the space comprised within the re-entry bulb 53, Fig. 9. A certain number of these electrons pass through the controlling grid 65, Figs. 8 and 9, the number of electrons which pass per unit of time being in large measure determined by the potential of the grid 65 with respect to the filament 61. The grid 65 is held at a certain mean negative potential with respect to the filament 61 by the battery 103, Fig. 4, this potential being preferably approximately equal to the mid-point of the grid-potential electron-current characteristic, to the end that there is produced an electron flow of a certain median value. Further differences of potential induced between the grid 65 and the filament 61 by the portion 46 of the secondary winding 39 of the mutual inductance coil 40, which differences of potential correspond to the modulations of the image analogue received on the aerial 35, cause an increase or decrease over the mean electron flow.

After passing through the grid 65 the electrons enter the space within the focusing electrode 68, which latter is maintained at a negative potential with respect to the grid 65 by the battery 106. Consequently the electrons are repelled by the focusing electrode 68, and due to the direction of the forces in the electric field the electrons are constrained to take up a position along the axis of this electrode and to be expelled from the open mouth of the electrode. The focusing electrode 68 acts as a partial electrostatic shield to the controlling grid 65, as a result of which the electrons are not subject in any considerable measure to the major field existing between the focusing electrode 68 and the accelerating grid 94 until the electrons approach a position near the mouth of the focusing electrode. The electrons are further attracted by the accelerating grid 94, and repelled by the focusing electrode 68 and the grid 65, both of which last-mentioned parts are made negative with respect to the accelerating grid 94 by means of the battery 107 acting through the leads 108 and 109. From the above description it will be clear that the function of the grid and associated elements is to feed electrons into the accelerating electrode 68, and that the function of the latter is to collect the electrons along the center of the tube, and, in conjuncion with the accelerating grid 94, to project these electrons as a beam along the axis of the tube.

In its passage from the focusing electrode 68 to the accelerating grid 94 the cathode beam 105 passes between the deflecting electrodes 75, 76, and 77, 78, by which it is bent away from the axis of the tube and made to swing in a continuous circular motion about the axis of the tube by the force of a rotating electrostatic field active in the space comprised between these electrodes. This field is produced by subjecting each of the pairs of electrodes 75, 76, and 77, 78, respectively, to a sinoidal difference of potential generated in the stationary armature coils 111 and 112 of the two-phase alternator 121, the potential impressed on the one pair of electrodes, 75, 76, being in quadrature with that in the other pair of electrodes 77, 78.

The beam 105 falls upon the annular accelerating grid 94, but a large part of the electrons comprising the beam pass through this grid and are projected upon the commutator segments 87, which take up the charge of the electrons constituting the beam and pass this negative charge on to the electrodes 11a, 11b, 11c, etc., of the cell 5. Since the beam rotates about the axis of the commutator sectors 87, each of the electrodes 11a, 11b, 11c, etc. receives a negative charge according to a definite order of succession, and of a value determined by the length of contact of the electron stream with each segment, (the term "contact" here of course signifying electrical rather than mechanical contact) as also by the intensity of the beam, the latter being determined as above explained by the number of electrons passed by the anode per unit of time, as controlled by the momentary value of the relative potential difference existing between the amitting filament 61 and the controlling grid 65.

The rotating field piece 122 of the alternator 121 is driven by a motor 123 which receives energy from a battery 124, one rotation of the field piece and one rotation of the cathode beam taking place for each rotation of the shaft 125 of the motor 123. On an extension of the motor shaft 125 is carried the pinion 126 which drives through the gear 127 and the shaft 128 the brush 129 of the commutator 43 to make contact with the sectors 130 thereof. The brush 129 has electrical connection through the lead 41 with one terminal of the secondary 39 of the mutual inductance coil 40. An insulating coupling 131 in the shaft 128 serves to localize the electric charge active in the lead 41 and the brush 129.

The mechanical reduction secured by the gear 127 and the pinion 126 is in the ratio of 12:1, hence the cathode beam 105 makes contact with each of the 12 segments 87 of the commutator 44 while the brush 129 is contacting one segment 130 of the commutator 43. Means are thus provided for individually and selectively exciting any given pair of the electrode elements of the opposed electrodes 10 and 11. It will be noted that the leads 41, 42, and 45, are so arranged with respect to the commutators 43 and 44 that when the potential of an element of the electrode 10 contacted by the commutator 43 increases in one sense, the potential of an element of the electrode 11 contacted by the commutator 44 increases in an opposite sense, and vice versa: the intervening dielectric is thus strained at points marked by the intersection of these electrodes, modifying radiation incident thereon to produce a unit area of a composite image. These unit areas are multiplied by the coordinate rotation of the commutators to produce a complete mosaic image.

While I have described my invention with respect to the preferred form thereof, I reserve the right to make such changes in the details of construction or such substitution of equivalents as conform to the spirit of the invention or fall within its scope as defined by the appended claims. It is moreover not indispensible that all features of the invention be used conjointly, since they may be advantageously employed in various combinations or subcombinations.

I claim:

1. An apparatus for the formation of images from an electric current analogue including an electro-optic cell comprising a plurality of parallel linear electrodes to define one coordinate of a plane image, a plurality of parallel linear electrodes arranged at an angle with said first linear electrodes to define a second coordinate of a plane image, means including a cathode ray commutator for periodically subjecting members of said electrodes to an electromotive force corresponding to modulations in said electric current analogue, and means including a resistance to reduce said electromotive force active on said electrode in the interval between the periodic applications of said electromotive force.

2. In apparatus for the formation of images, the combination of a Kerr cell comprising a pair of spaced electrode systems, each of said electrode systems comprising a plurality of spaced adjacent linear electrodes, the electrodes of one system disposed at an angle to those of the other system, an electro-optically active dielectric between said systems, a resistance associated with each of the electrodes of at least one of said systems to drain away a charge brought to act individually on said electrodes, and means including an electron beam for charging the electrodes of one of said systems according to a predetermined sequence.

3. In apparatus for the formation of images, the combination of a Kerr cell comprising a pair of spaced electrode systems, each of said electrode systems comprising a plurality of spaced adjacent linear electrodes, the electrodes of one system disposed at an angle to those of the other system, an electro-optically active dielectric between said systems, an impedance associated with each of the electrodes of at least one of said systems to drain away a charge brought to act individually on said electrodes, and means including an electron beam for charging the electrodes of one of said systems according to a predetermined sequence.

4. An apparatus for the formation of images from an electric current analogue including a light valve having a plurality of electrodes at right angles to one another, a birefringent member between said electrodes, means including a cathode ray to periodically subject said cells to a difference of potential corresponding to modulations in said electric current analogue, and means including a resistance to reduce said difference of potential active on said cells in the interval between the periodic applications of said electromotive force.

5. An apparatus for the formation of images from an electric current analogue including a light valve having a plurality of electrodes at right angles to one another, a birefringent member between said electrodes, means including a cathode ray to periodically subject said cells to a difference of potential corresponding to modulations in said electric current analogue, and means including an impedance to reduce said difference of potential active on said cells in the interval between the periodic applications of said electromotive force.

6. An apparatus for converting the electric current analogue of an image into a real image, including a light-valve responsive to an electrostatic charge to produce a change of visual intensity said light valve composed of a plurality of electrodes at right angles to one another and a birefringent member between said electrodes, means including a cathode ray to repeatedly charge said light-valve to degrees corresponding to successive portions of said analogue, and means including an impedance to drain away each of said charges before the succeeding charge is brought to act.

7. An apparatus for converting the electric current analogue of an image into a real image, including a light-valve responsive to an electrostatic charge to produce a change of visual intensity said light valve composed of a plurality of electrodes at right angles to one another and a birefringent member between said electrodes, means including a cathode ray including an electron stream commutator to repeatedly charge said light-valve to degrees corresponding to successive parts of said analogue, and means including an impedance to drain away each of said charges before the succeeding charge is brought to act.

8. An apparatus for converting the electric current analogue of an image into a real image, including a translating device involving a light valve having a plurality of electrodes at right angles to one another, a birefringent member between said electrodes, means including a cathode ray commutator to repeatedly charge said Kerr cell to degrees corresponding to succeeding portions of said analogue, and means including an impedance to drain away each of said charges before the succeeding charge is brought to act.

9. An electro-optical system including a group of linearly arranged light valves, said light valves comprising adjacent electrodes fixed at both ends, an optically active dielectric between said electrodes, a space current commutator for periodically charging said electrodes, and an impedance for reducing said charge in the interval between the periodic applications of said electromotive force.

10. An electro-optical system including a plurality of light valves, said light valves comprising fixed adjacent electrodes, a birefringent dielectric between said electrodes, a space current commutator for periodically charging said electrodes to modify the optical properties of said dielectric, and means for reducing said charge in the interval between the periodic applications of said electromotive force.

NOEL DEISCH.